Feb. 7, 1961 A. FRÖHLICH ET AL 2,970,342
VULCANIZING PRESS
Filed Oct. 17, 1957 5 Sheets-Sheet 1

ADOLF FROHLICH
EDWARD J. HARRIS
INVENTORS

BY William Freeman
ATTORNEY.

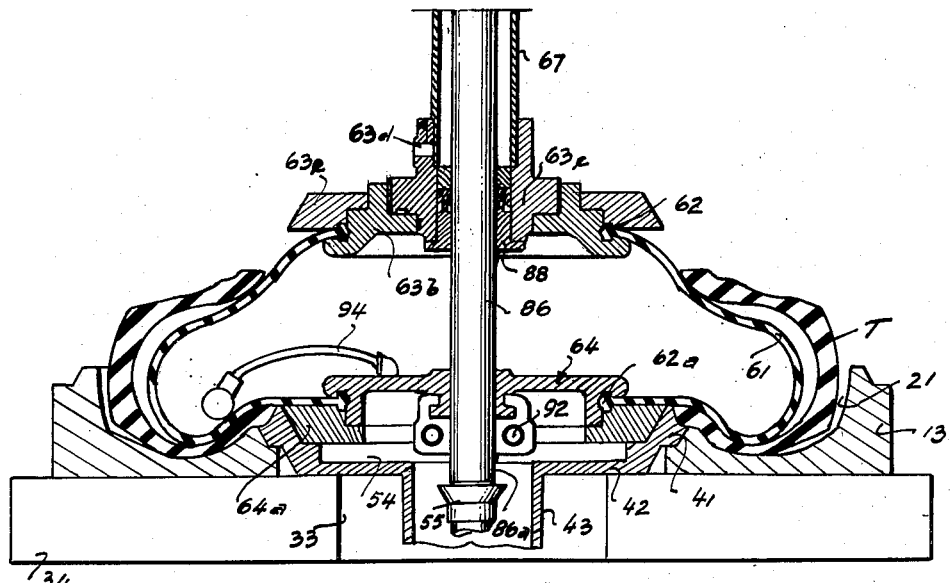
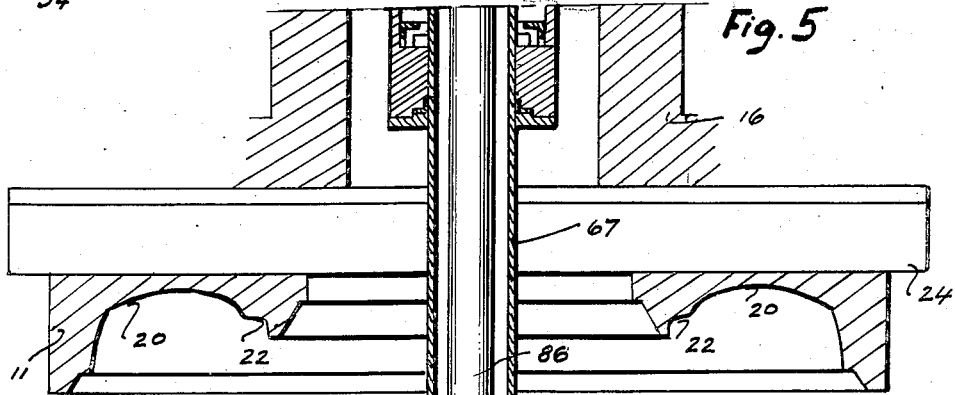
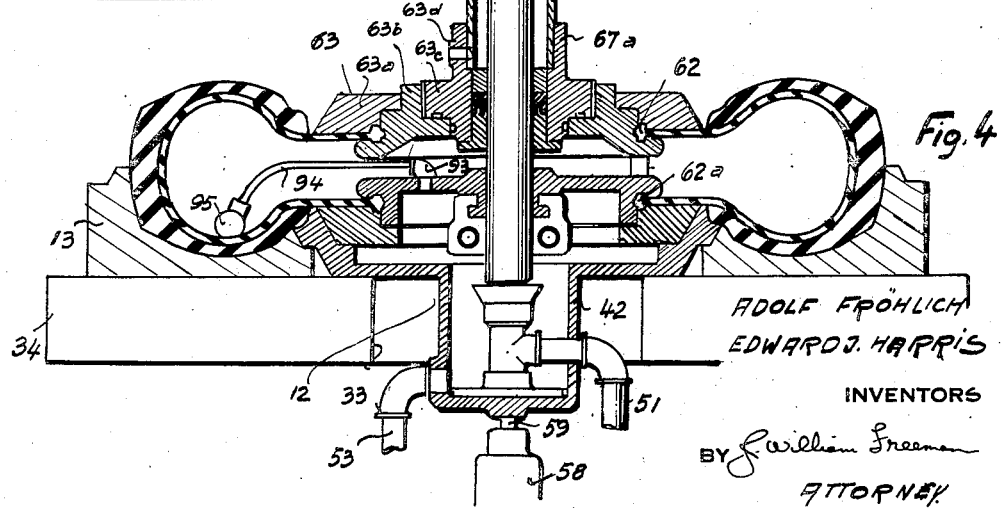

ADOLF FRÖHLICH
EDWARD J. HARRIS
INVENTORS

BY J. William Freeman
ATTORNEY

United States Patent Office 2,970,342
Patented Feb. 7, 1961

2,970,342
VULCANIZING PRESS

Adolf Fröhlich and Edward J. Harris, Akron, Ohio, assignors to The Cleveland Trust Company, Cleveland, Ohio Filed Oct. 17, 1957, Ser. No. 690,675

10 Claims. (Cl. 18—17)

This invention relates to the art of vulcanizing pneumatic tires and in particular has reference to improvements in vulcanizing presses wherein an automatic former is automatically positioned and withdrawn from the interior of a shaped tire during vulcanization.

In applicants' co-pending application Serial No. 480,517, now Patent No. 2,880,458, filed January 7, 1955, there is disclosed an improved type of pneumatic former that is characterized by the fact that the former per se is carried by a relatively movable upper mold section. Also disclosed in this case was the fact that the former was invaginated within the upper head casting of the mold section so as to be capable of being withdrawn from the interior of the tire during vulcanization.

In applicants' co-pending application Serial No. 517,610, filed June 23, 1955, there was disclosed an improvement over the above referred to co-pending application wherein the invaginated former was sealed off in its condition of invagination, to thus protect the former from the detrimental effects of the carrying medium thereon during the actual vulcanization processes.

In applicants' co-pending application Serial No. 538,225, now Patent No. 2,848,740, filed October 3, 1955, a complete sealing off of the former was disclosed along with other additional improvements.

While the above-captioned co-pending applications have all featured invagination of the former during curing, it was also disclosed in applicants' co-pending application Serial No. 538,186, filed October 3, 1955, that the invagination was not required if the opposed axial ends of the pneumatic former were made movable relatively of each other as well as being movable relatively of the mold section. Hence, in this last-mentioned co-pending application, there was introduced a principle of withdrawing a pneumatic former into an appropriate cavity provided in the movable head casting by effectuating movement of the axial ends relatively of each other and of the head casting. While this last-mentioned co-pending application did eliminate the principle of invagination employed in the preceding cases, it did feature withdrawal and sealing off of the former member after the preliminary shaping operation with the result that the actual curing of the tire was done without the use of a pneumatic former, in view of the fact that the former had been withdrawn after the preliminary shaping had occurred.

It is believed apparent that the structure that operates to move the mold sections relatively of each other in presses of this type may be any one of several types of presses conventionally employed in this regard. As a representative example of a press structure operable, attention is directed to applicants' co-pending application Serial Number 480,517, filed January 7, 1955.

In the prior art, it has been conventional in the past to dispose the pneumatic former in projecting relationship with the lower mold section, with various means and devices having been employed. In this regard, it will be noted that the above noted co-pending applications have been characterized by the fact that the same teach the provision of the pneumatic former being carried by the upper, relatively movable, mold section in direct contrast to the teachings of the prior art.

While this form of press has been successful from a practical standpoint because of the ease with which flat-built tires may be positioned on the lower mold section without having to lift the same over the projecting former, difficulty has been encountered in the past in effectuating supply and withdrawal of vulcanizing medium from the interior of the lower mold section to the interior of the former.

While the above types of vulcanizing presses referred to in the above referred to co-pending applications have in general proved satisfactory during usage, it has been found that substantially equivalent results can be obtained at a lesser cost by eliminating the chamber or cavity in the upper mold section within which the former is withdrawn. Specifically, it has been found that if the axial ends of the former are made movable relatively of each other as well as being movable relatively of the upper mold section, that an effective stripping action can occur.

It has been further found that the aforementioned difficulty of effectuating supply and withdrawal interiorly of the former can be obviated by provision of a releasable type of connection between the lower mold section and the extreme projecting end of the pneumatic former, with internal supply of vulcanizing medium being possible during contact between the former and the lower mold section, and with evacuation of condensate from the interior of the former being also possible during such contact.

It accordingly becomes a principal object of this invention to provide an improved type of vulcanizing press that features the use of a pneumatic former that is carried by the upper mold section so as to project towards the lower mold section, and which is capable of coaction with ejection means carried by the fixed lower mold section.

It is a still further object of this invention to provide an improved type of vulcanizing press wherein ejection means and pneumatic forming means provided on the respective opposed mold sections of a press, are movable relatively of each other and also each movable relatively of the mold sections supporting the same.

It is a still further object of this invention to provide an improved type of vulcanizing press characterized by the provision of a projecting former on the upper mold section and further characterized by the provision of positive means for supplying vulcanizing medium from the lower mold section to the interior of the former as well as means for exhausting condensate from the interior of the former into the lower mold section for ultimate evacuation.

These and other objects of the invention will become more apparent upon a reading of the following brief specification, considered and interpreted in the light of the accompanying drawings.

Of the drawings:

Figure 4 is a similar view but showing initial state of opening of the press after curing has been completed.

Figures 5 and 6 are similar sectional views showing removal of the former from the cured tire.

Figure 1:
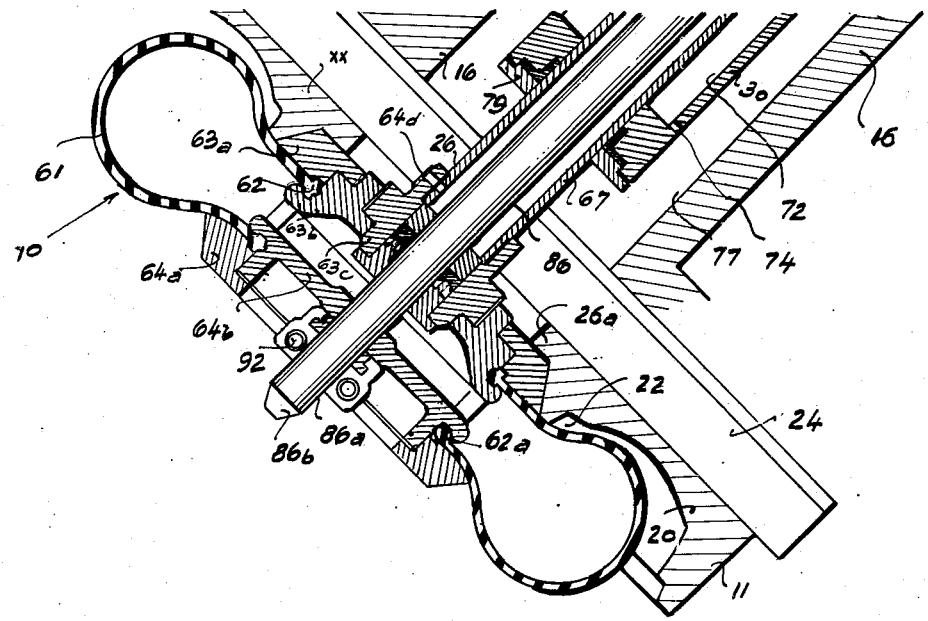
Figure 1 is a cross-sectional view partly broken away in sections and showing a position of the component parts when the press is in its fully opened condition prior to vulcanization.
Figure 3:
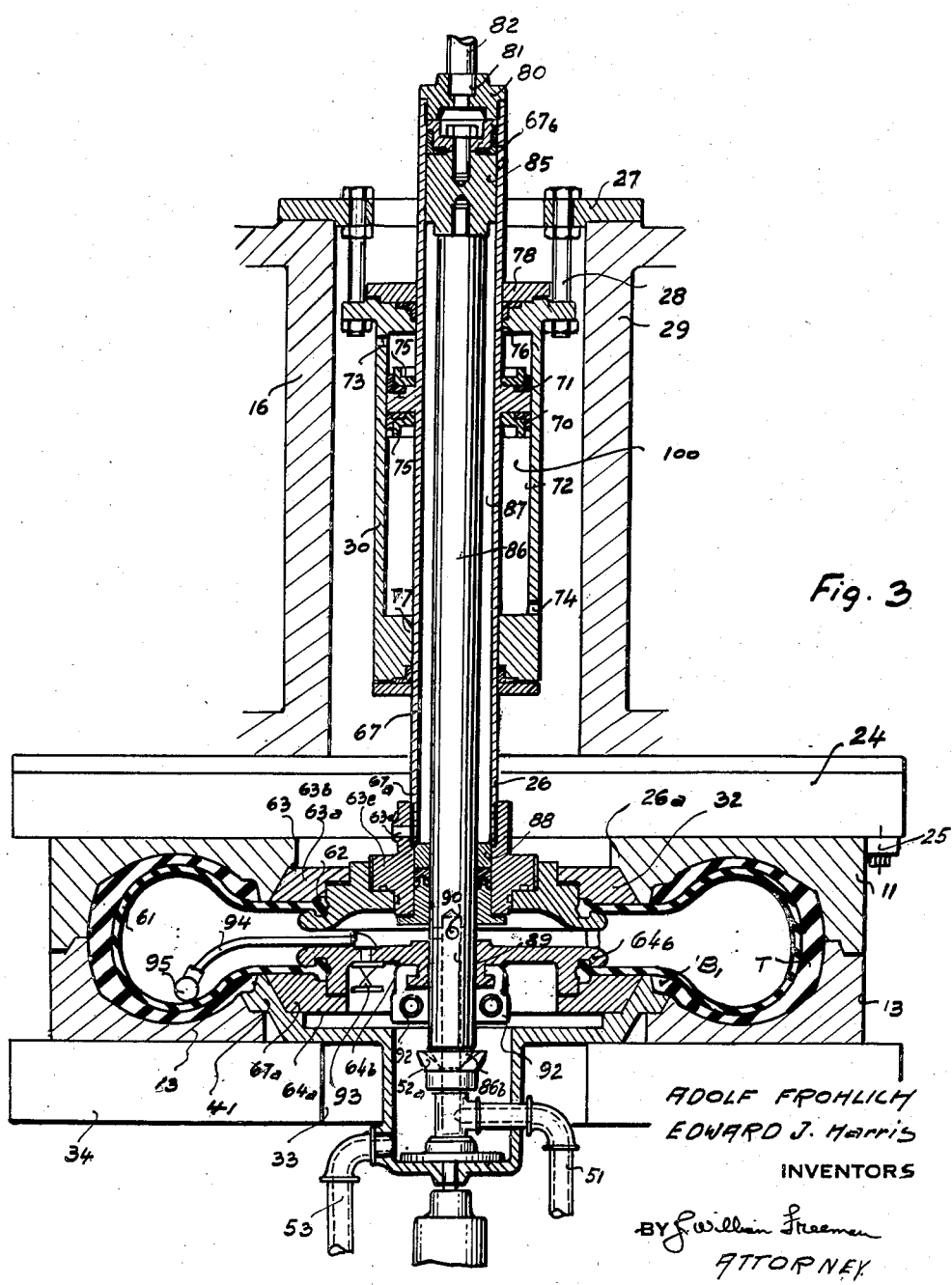
Figure 3 is a similar view showing the press in fully closed curing condition.
Figure 7:
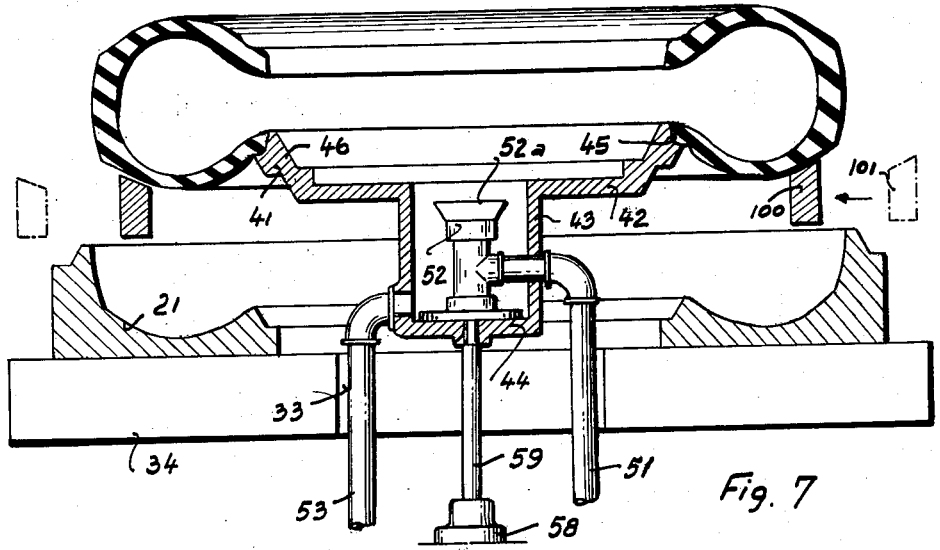
Figure 7 is a similar view but showing the press in fully opened position with the cured tire positioned on the ejector ring.

Referring now to the drawings and in particular to Figures 1 and 7 thereof, it will be seen that the improved pneumatic former, generally designated by the numeral 10, is shiftably carried by an upper mold section 11 so as to be capable of insertion and withdrawal with respect to a tire T that is supported on a bead ejector mechanism 12 of a lower mold section 13; the arrangement being such that the tire T will be deformed to the toroidal shape of Figures 3 through 7 by the automatic positioning of the former 10 during closure of the mold sections 11 and 13 to the position of Figure 3.

With regard to the press structure, it has been previously indicated that the mold sections 11 and 13 may be carried by any suitable type of press mechanism. Accordingly, attention is directed to applicants' co-pending application Serial No. 480,517, filed January 7, 1955, wherein a press of this general type is described.

Description of the mold sections 11 and 13

Referring to the drawings, it will be seen that each mold section 11 and 13 is provided with an appropriate design-imparting surface 20 and 21 respectively, with the surface 20 of upper mold section 11 terminating, at the radially innermost portion thereof, in a bead seat 22 while the bead region of surface 21 is defined by component parts of the ejector means 12 as will hereinafter be described.

Figure 2:
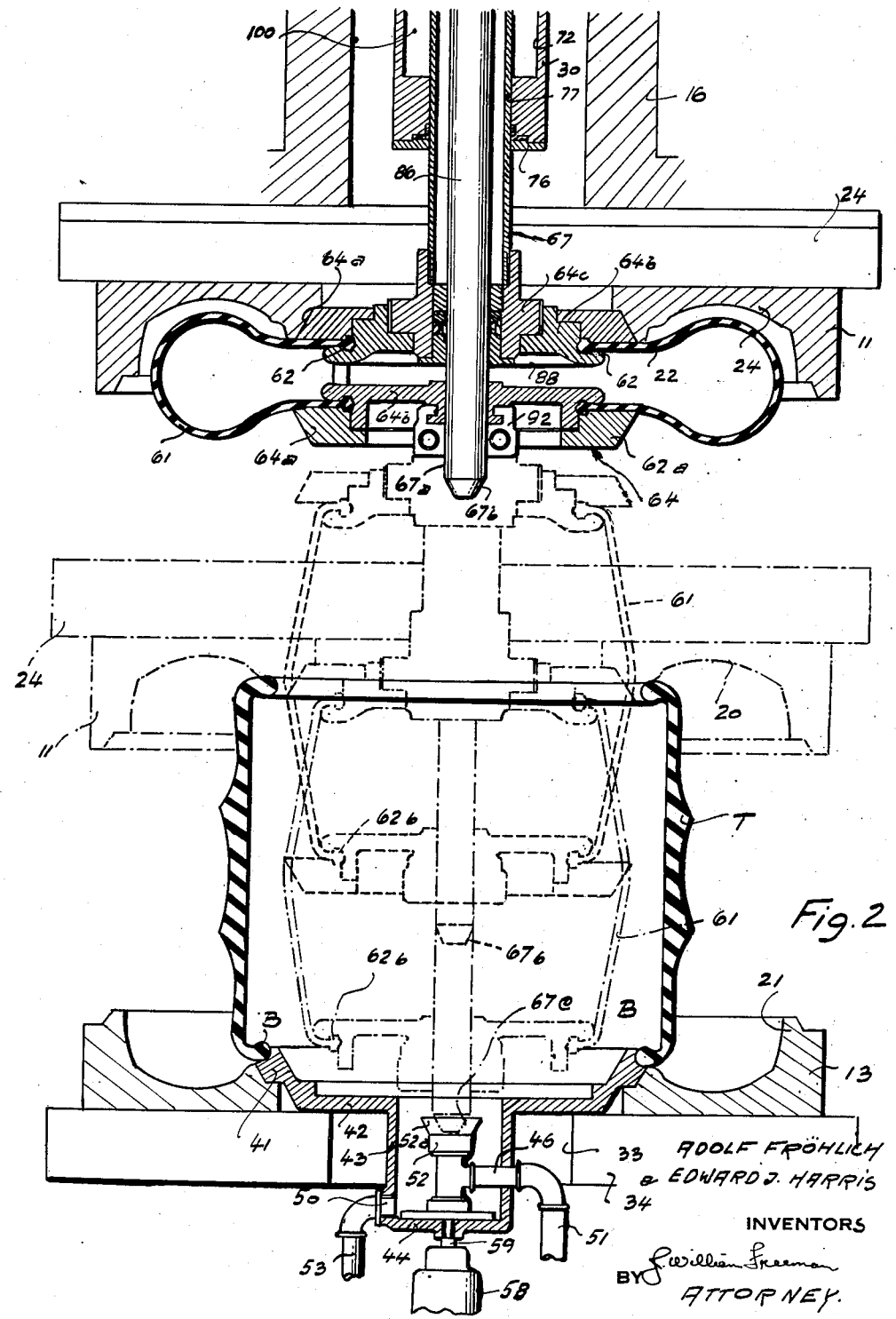
Figure 2 is a view similar to Figure 1 but illustrating the press in various positions of closure with the various positions being represented in full, chain-dotted and dotted line positions.

As is best shown in Figure 2 of the drawings, the mold section 13 is releasably secured to an upper head casting that is generally indicated by the numeral 24 in Figure 3 of the drawings with bolts 25, 25 or the like being employed in this regard, and with the head casting 24 preferably being hollow so as to provide a chamber for heating medium as is well known in the prior art.

For the purpose of supporting the pneumatic former 10, in axially shiftable relationship on mold section 11 as will be described, the head casting 24 and the mold section 11 are concentrically bored, as at 26 and 26a respectively, for coaction with a tubular element 16 within which is concentrically received an adaptor sleeve 30 with top plate 27 concentrically suspending sleeve 30 by use of spacer bolts 28, 28 that interconnect top plate 27 with flange 29 of sleeve 30.

By like token, the bore 26a of lower mold section 13 also defines a concentric tapering seat 32 within which may be received certain components of the ejector means 12 as will be described. Additionally, a central aperture 33 is provided in the lower support casting 34 upon which the mold 13 rests, to permit concentric shifting of the ejector means 12.

The ejector means 12

The ejector means per se are shown defined by circular sleeve-like element of stepped cross-sectional configuration that is indicated generally by the numeral 40 in the drawings. This element 40 preferably includes a bead ring segment 41, a radially projecting wall segment 42, a circular axial segment 43, and an end wall 43, with these just-described components defining a condensate receptacle as is shown in the drawings. In this manner, the bead ring 41 may include a bead seat 45 against which the lower bead $B_1$ of tire T may be received as is clearly shown in the drawings. Additionally, this bead ring segment 41 may have its radially innermost surface 46 tapered for coaction with certain component parts of the pneumatic former 10, as will presently be described.

For the purpose of introducing vulcanizing medium interiorly of the former and effectuating withdrawal of the condensate occurring therein prior to and during vulcanization, the axial wall segment 43 is provided with apertures 47 and 48 through which may be passed conduit members 49 and 50, respectively with the conduit 49, through supply line 51, serving to introduce vulcanizing medium to adapter fitting 52, while conduit 50 may be attached to an exhaust line 53 for the purpose of evacuating condensate collecting on the end wall 44. Additionally the surface 54 of wall segment 42 of ring 41 provides a collection point for condensate occurring interiorly of the pneumatic former with emission from the interior of the former being possible through valve 55, as will presently be described. In this regard, the surface 54 may be inclined to provide proper drainage.

Additionally, and to the end of shifting the entire ejector mechanism 12 to the position of Figure 7, the press structure also includes a piston member 58 that is secured in fixed relation to lower mold 13 so as to have its operative end 59 secured to the underside of the end wall 44. In this manner, actuation of piston 58 will cause the ejector mechanism to project above the mold section 13 as is clearly shown in Figure 7 of the drawings.

With regard to the structure of the adapter fitting 52, it will be noted that the same is provided with an internal passage 52a that extends between flared mouth opening 52b and conduit 49 so as to permit fluid flow through fitting 52. In this manner fluid from line 49 can be introduced interiorly of former.

The pneumatic former 10

As has been previously indicated, the pneumatic former 10 coacts with and is movable relatively of the bead ejector ring 12, and is additionally movable relatively of both the upper and lower mold sections 11 and 13, respectively.

Accordingly, the former, previously indicated generally by the numeral 10, is shown including a resilient tubular sleeve 61 having its beaded ends 62 and 62a respectively connected to axial end members that are designated generally by the numerals 63 and 64 respectively, with end member 63 being disposed adjacent upper mold section 11 while end member 64 is presented at the outermost projecting end of former 10.

With reference to the structure of end member 63, it will be seen that the same includes concentric clamping ring 63a, 63b and 63c that are appropriately contoured to fix beaded end 62 of sleeve 61 with respect to the lower end 67a of a tubular sleeve 67, with this sleeve 67 being concentrically telescoped within sleeve 30 so that upon axial shifting of sleeve 67 within previously described sleeve 30, an equivalent axial shifting will occur between beaded end 62 and mold section 11. Appropriate bolts 63d secure ring member 63c with respect to end 67a as is shown in the drawings.

To the end of facilitating axial shifting of sleeve 67 within sleeve 30 as indicated above, the sleeve 67 is shown provided with a medianally located, radially extending, flange 70 that has a peripheral edge 71 that rides against the internal surface 72 of sleeve member 30 as is shown in Figure 3 of the drawings. Apertures 73 and 74, provided in the wall of the sleeve 30 as shown in Figure 3, permit entrance of pressurizing fluid into the annular cavity 100 (Figure 3) defined by the external surface of sleeve 67 and the internal surface 72 of sleeve 30, with standard type of supply connections (not shown) being capable of use in this regard. Packing 75, 75 obviate leakage between the flange 70 and sleeve 30.

While the shaft 67 has the flange portion 70 thereof journalled against wall surface 72 as has just been described, concentric disposition of the sleeve 67 in shiftable relationship with respect to sleeve 30 is further insured by the use of axially spaced land areas 76 and 77 with these land areas being disposed adjacent the opposed axial ends of sleeve 30 as is shown in the drawings and with conventional cap plates 78 and 79 being disposed adjacent thereto for the purpose of obviating leakage around the shaft 67.

To the end of permitting relative axial movement between beaded ends 62 and 62a, the uppermost end 67b of shaft 67 is shown provided with a cap 80 having an aperture 81 therethrough by means of which pressurized fluid, from conduit 82, can be admitted interiorly of the sleeve 67.

Reacting against pressure admitted through just-described conduit 82 is an enlarged head portion 85 of a cylindrical shaft 86, the arrangement being such that the shaft 86 is concentrically telescoped within sleeve 67, with head portion 85 sliding against the internal surface 87 of sleeve 67 as is clearly shown in Figure 3 of the drawing. Concentric journalling of the just-described shaft 86 on the axis of rotation of tire T is further facilitated through use of a cylindrical block 88 that is carried concentrically of ring 63 so as to align and seal the shaft 86 with respect thereto while permitting relative movement thereof.

In order that fluid from supply line 51 may be dispatched interiorly of former 10 as previously indicated, the lowermost end 86a of shaft 86 is shown provided with an axial bore 89 that leads to and communicates with a plurality of cross-bores 90, 90 that extend radially of the axis of rotation of shaft 86 as is clearly shown in Figure 3 of the drawings. Additionally, the extreme end 86b of shaft 86 is tapered so as to complementally seat within flared mouth opening 52a of adaptor fitting 52 and in this manner, vulcanizing medium from line 51 will pass through adaptor fitting 52, bores 89 and 90 for emission interiorly of the former 10.

It has been previously indicated how the beaded end portion 62 of sleeve 61 is fixed with respect to sleeve 67 so as to permit relative movement thereof with respect to the upper mold section 11. In order that equivalent relative movement may occur between the beaded portion 62d and mold section 11, the same (beaded end 62a) is shown clamped between concentrically disposed rings 64a and 64b with ring 64b being fixed on shaft 86 by use of clamping blocks 92, 92 in known manner. In order that the axial end member 64 may seat with ejector means 12 as previously indicated, the peripheral edge surface 64c of ring 64a is shown tapered to seat against the surface 46 of ejector means 12.

For the purpose of withdrawing condensate occurring interiorly of the former 10, the ring 64b is shown provided with a valve 93 that controls the emission of condensate from line 94 with pick-up head 95 being preferably disposed in the low-spot of the former for effective condensate pick-up. In this regard, it will be noted that the exhaust line 53 will exert a vacuum pressure on the line 94 as a result of a closed chamber that is created when the ejector means 12 and end member 64 are in engagement as has previously been described.

Operation of the device

In use or operation of the device, it will be first assumed that the component parts are positioned as shown in Figure 1 of the drawings with the press being opened so that the upper mold section 11 is spaced from the lower mold section 13 and with the pneumatic former 10 retracted against the upper mold section 11 when the same is in the cocked position of Figure 1. At this time, a flat-built tire T may have its lower bead portion $B_1$ concentrically disposed on the bead seat 45 of the bead ejector means 12 with this condition of component parts being clearly illustrated in Figure 1 of the drawings. It will further be assumed in this regard that the proper steam and exhaust lines have been connected and that the press structure is ready to operate as will hereinafter be described.

At this time, the press may be operated in the manner set forth in the above referred to co-pending applications to cause the upper mold section 11 to pivot to the full line position of Figure 2 and upon reaching of this condition, the former 10 may first be extended as a unit from the upper mold section 11 by introducing pressure interiorly of the sleeve member 30 through port 73 so as to cause the flange portion 70 to move axially downwardly and accordingly cause both ends 63 and 64 of the former 10 to be shifted away from the mold section 11 in unison and in axially collapsed condition. After the former 10 has been spaced as just indicated, the axial ends 63 and 64 thereof may be separated axially of each other by introducing pressure through line 82, which pressure will cause the head portion 85 of shaft 86 to move axially with respect to the sleeve member 67 with the result that the axial ends 63 and 64 will be separated to the condition indicated in dotted lines in Figure 2 of the drawings.

When the dotted line condition of Figure 2 has been reached, the upper mold section 11 may be moved in a straight-line approach towards the lower mold section 13, and as such movement continues it is believed apparent that the condition illustrated in chain-dotted lines in Figure 2, will soon occur, with this condition being the initial point of contact between the lower end 86b of shaft 86 and the adaptor fitting 52.

After this initial contact, as illustrated in chain-dotted lines in Figure 2 of the drawings, has occurred, the shaft 86 will move axially of sleeve 67, with the result that as further downward closing movement of the press continues, there will be relative axial movement between the opposed axial ends 63 and 64 of the pneumatic former 10. It is to be noted in this regard that simultaneously with the engagement between the shaft 86 and adaptor 52, there occurs a similar seating engagement between the ring member 64a and the bead ejector 12 with surfaces 64c and 46 being mated at this point, as is clearly illustrated in Figures 2 and 3 of the drawings.

After the just-described initial contact has been made between the component parts, it is believed apparent that steam under pressure may be introduced through conduit 51 and adaptor fitting 52 so as to pass through passage-ways 89 and 90 into the interior of the former 10. In this manner, a radial expanding force will be created interiorly of the former 10 with the result that the same will shape the tire to the position of Figure 3 coincident with a complete closing of the press as is shown in Figure 3.

Because the introduction of vulcanizing medium interiorly of the former 10 as just-described will result in the occurrence of condensate therein, it is at this point that the suction line 53 may be operated to effectuate withdrawl of such condensate, with this withdrawl occurring through pick-up head 95, flexible conduit 94, valve 93 and line 53. It is to be noted that condensate emitting through valve 55 will collect on the preferably inclined surface 54 so as to drain on to end wall 54 of bead ejector 12 to thus permit withdrawal of the same through exhaust line 53. In this regard, the preferred embodiment of invention contemplates the use of a rapid withdrawal in the manner set forth in applicants' co-pending application Serial Number 646,727, filed March 18, 1957.

At such time as the vulcanization of the pneumatic tire is completed, the removal of the cured tire T from the press may be effectuated by first exhausting, through port 74, chamber 100 (Figure 3) and then moving the upper mold section 11 relatively of the upper end 63 of the pneumatic former 10.

In this manner the condition of Figure 4, wherein the upper mold section 11 is spaced with respect to the former 10 will be achieved with sleeve 30 and mold section 11 moving relatively in unison of the tire T and sleeve 67.

At this point, and with the parts positioned as shown in Figure 4, additional opening movement of the upper mold section 11 will result in simultaneous movement therewith of the upper end portion 63 of the pneumatic former 10, with the mechanical engagement of the flange 70 with the lower end of sleeve 30 effectuating a lost motion type of movement. This just-described will cause the sleeve 61 of former 10 to be stripped from the upper half of the cured tire as is shown in Figure 5.

Figure 6:
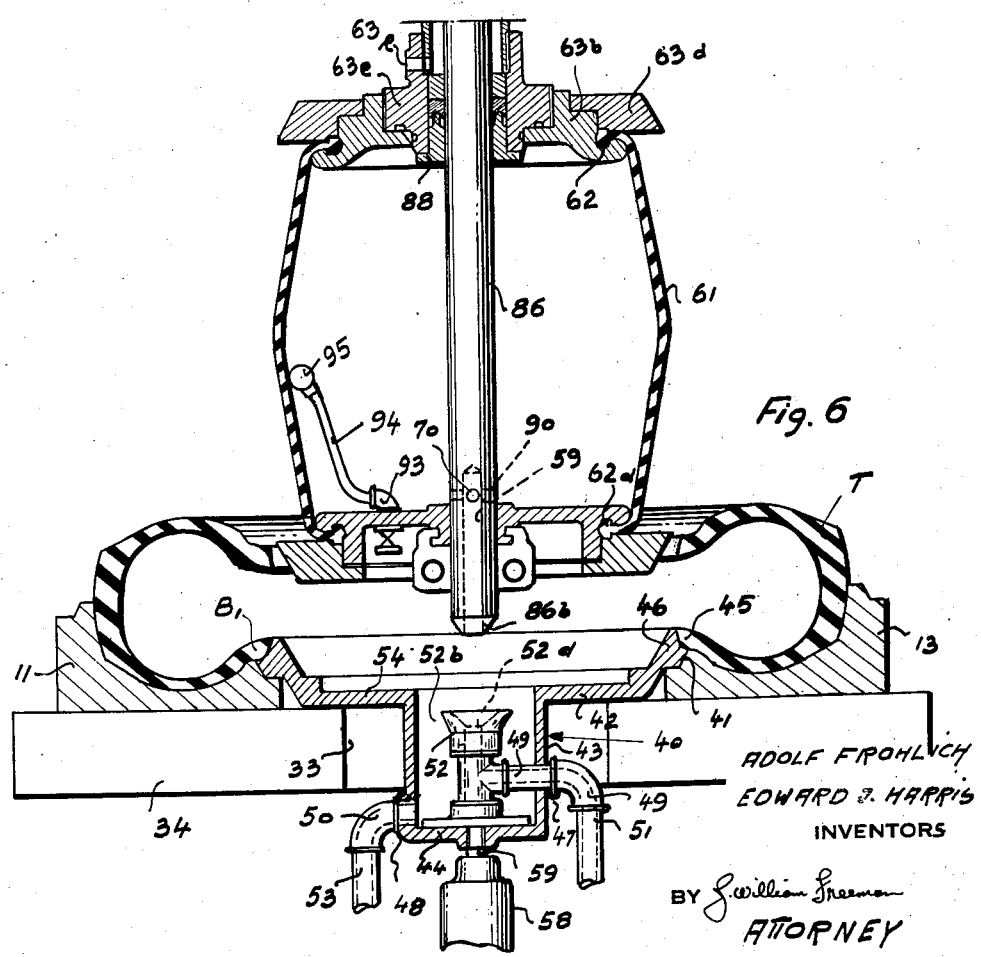

Complete stripping of the bladder from the interior surface of the tire will next occur as shown in Figure 6 upon further upward movement of the lower end 64 of the pneumatic former 10 with this movement occurring upon contact between enlarged end 85 and shaft packing 88. At this point, continued upwart movement of the press will result in complete stripping of the diaphragm 61 with respect to the internal wall surface of the cured tire T with ends 63 and 64, and mold section 11 moving in unison.

With the sleeve or diaphragm 61 removed as indicated, and with the upper half of the tire having been stripped from its mold section as just-described, the lower portion of the tire T may be stripped from mold section 13 by actuation of cylinder 58 which will cause the ejecting mechanism 12 to move upwardly to the position of Figure 7 so as to be completely separated from the design-imparting surfaces of both mold sections 11 and 13 as is clearly illustrated in Figure 7 of the drawings.

At this point, movable arms shown schematically by the numeral 101 in Figure 7 of the drawing, may be moved beneath the tire and operated to engage the same so as to suspend the tire thereon upon retraction of the ejecting means 12 to the position of Figure 1.

At this time, in following withdrawal of the arm members together with the tire thereon, a new uncured tire may be placed on the bead seat of the ejector means 12 for repetition of the above-described cycle of events.

It will be seen from the foregoing how there has been provided a new and novel type of vulcanizing press that is characterized by the relative movement of a pneumatic former with respect to both of the conventional upper and lower mold sections of a vulcanizing press.

It has been shown how the use of a pneumatic former that is carried by the upper mold section greatly reduces the space requirements of the vulcanizing press and further how the combined coaction between a former and a bead ejection means that are both movable relatively of the opposed mold sections and each other permits complete ejection of the tire in a fully automatic cycle.

It has also been shown how the approach of the ejecting pneumatic former serves to automatically concentrically align the uncured tire on the bead ring of the lower mold section with the result that at all times the actual closing and positioning operation simultaneously operates to concentrtically align the tire so that perfect positioning thereof will at all times occur. Further, it has been shown how the use of withdrawal means facilitates condensate removal and fluid supply between a former and the mold section opposed thereto.

While a full and complete disclosure of the invention has been made in accordance with the dictates of the patent statutes, it is not intended that the invention be limited to the specific embodiments recited herein.

Accordingly, where possible, the invention contemplates the use of equivalent mechanisms and accordingly, modifications of the invention may be resorted to without departing from the spirit hereof or the scope of the appended claims.

This application is a continuation-in-part of the following co-pending applications of applicants:

(a) Serial No. 480,517, filed January 7, 1955
(b) Serial No. 517,610, filed June 13, 1955
(c) Serial No. 538,225, filed October 3, 1955
(d) Serial No. 538,186, filed October 3, 1955

We claim:

1. A vulcanizing press of the character described, comprising; a first mold section; a second mold section; means for moving said mold sections relatively of each other between open and closed positions, with said mold sections defining an annular tire curing cavity when positioned in said closed position; a pneumatic former having a projecting end and being carried by said first mold section and being positioned within said cavity when said mold sections are closed; fluid supply means carried by said second mold sections and including a discharge opening; the projecting end of said former being guided into concentricity with said second mold section upon contact with said discharge opening, whereby said fluid supply means can deliver fluid from said second mold section to the interior of said former that is carried by said first mold section.

2. A vulcanizing press of the character described, comprising; a first mold section; a second mold section; means for moving said mold sections relatively of each other between open and closed positions, with said mold sections defining an annular tire curing cavity when positioned in said closed position; a pneumatic former carried by said first mold section and being positioned within said cavity when said mold sections are closed; fluid supply means carried by said second mold sections and including a discharge opening; and connecting means carried by the projecting end of said pneumatic former and releasably interconnecting with said discharge opening during closure of said press, whereby said discharge opening and said connecting means guide said former into concentricity with said lower mold section and permit delivery of fluid from said fluid supply means to the interior of said former.

3. The device of claim 1 further characterized by the presence of; condensate removal means carried interiorly of said former; and exhaust means carried by said second mold section and being operatively associated with said condensate removal means during the time that fluid is being supplied to the interior of said former, whereby condensate occurring interiorly of said former may be removed therefrom by said condensate removal means and said exhaust means.

4. A vulcanizing press of the character described, comprising; a first mold section; a second complemental mold section; means for moving said mold sections relatively of each other between open and closed positions, with said mold sections defining an annular tire curing chamber when closed; former supporting means shiftably carried by said first mold section; a pneumatic former having axial ends that are secured to said former supporting means; said former projecting axially of said first mold section towards said second mold section; means for axially shifting both axial ends of said former relatively of said first mold section to a condition of projection beyond the same; means for axially collapsing said projecting former upon contact thereof with said second mold section during movement of said mold sections towards said closed position; means for retaining said former in said axially collapsed condition within a cured tire during initial separation of said first and second mold sections; means for axially expanding said former during subsequent separation of said first and second mold sections; said tire remaining seated against said second mold section during stripping of said former from said cured tire.

5. A vulcanizing press of the character described, comprising; a pair of relatively movable complemental first and second mold sections moving between open and closed positions and defining an annular tire curing chamber when closed; former supporting means shiftably carried by said first mold section; a pneumatic former carried by said former supporting means and adapted to shape a tire received on said second mold section to toroidal configuration upon movement of said mold sections to said closed position; means for retaining said former in shaping position within a cured tire during initial separation of said first and second mold sections, means for shifting said former out of shaping position and stripping the same from said tire during subsequent separation of said first and second mold sections; said tire remaining seated against said second mold section during stripping of said former from said cured tire.

6. The device of claim 5 further characterized by the presence of means for stripping said tire from said second mold section following stripping of said former from said tire.

7. A vulcanizing press of the character described, comprising; a pair of relatively movable complemental first and second mold sections moving between open and closed positions and defining an annular tire curing chamber when closed; former supporting means shiftably carried by said first mold section; a pneumatic former carried by said former supporting means and adapted to shape a tire received on said second mold section to toroidal configuration upon movement of said mold sections to said closed position; means for retaining said former in shaping position within a cured tire during initial separation of said first and second mold sections, means for shifting said former out of shaping position and stripping the same from said tire during subsequent separation of said first and second mold sections; said tire remaining seated against said second mold section during stripping of said former from said cured tire; said former having opposed axial ends; said last-mentioned means including a lost-motion connection between said first mold section and said former supporting means.

8. A vulcanizing press of the character described, comprising; a pair of relatively movable complemental first and second mold sections movable between open and closed positions and defining an annular tire curing chamber when closed; former supporting means shiftably carried by said first mold section; a pneumatic former carried by said former supporting means and adapted to shape a tire received on said mold section to toroidal configuration upon movement of said mold sections to said closed position; supply means carried by said second mold section and supplying vulcanizing medium to the interior of said former when said former and said second mold section are in contact; means for retaining said former in shaping position within a cured tire during initial separation of said first and second mold sections; and means for shifting said former out of shaping position and stripping the same from said tire during subsequent separation of said first and second mold sections.

9. The device of claim 8 further characterized by the fact that said tire remains seated against said second mold section during stripping of said former from said cured tire.

10. The device of claim 8 further characterized by the presence of means for exhausting condensate from the interior of said former to said second mold section during the time that said supply means are supplying vulcanizing medium to the interior of said former.

References Cited in the file of this patent

UNITED STATES PATENTS

| | | |
|---|---|---|
| 1,755,048 | Brice | Apr. 15, 1930 |
| 2,495,663 | Soderquist | Jan. 24, 1950 |
| 2,700,180 | Mackay | Jan. 25, 1955 |
| 2,736,059 | Frank | Feb. 28, 1956 |